UNITED STATES PATENT OFFICE.

ALEXANDER S. RAMAGE, OF NEWARK, NEW JERSEY, ASSIGNOR TO JOHN H. MAUGHAM, TRUSTEE FOR A. S. RAMAGE, EVERLEY M. DAVIS, AND THE FIRM OF MAUGHAM & LEE.

DETINNING AND DEGALVANIZING SCRAP.

983,931.  Specification of Letters Patent.  Patented Feb. 14, 1911.

No Drawing.   Application filed July 3, 1909. Serial No. 505,933.

*To all whom it may concern:*

Be it known that I, ALEXANDER S. RAMAGE, a citizen of the United States, residing at Newark, in the county of Essex and State of New Jersey, have invented certain new and useful Improvements in Methods of Detinning and Degalvanizing Scrap, of which the following is a specification.

My invention relates to a method of detinning and degalvanizing scrap and has for its object to obtain the various products in a commercially available form.

The method which I prefer to use is as follows:—I take lead ashes or litharge and dissolve them in boiling caustic soda forming plumbate of soda. It is necessary to keep an excess of caustic soda present, otherwise from concentrated solutions litharge crystallizes out in the cold. If sulfate of lead is used, then it may be treated by the method described in Letters Patent No. 950,677, patented March 1, 1910, and so formed into plumbate of soda. The liquor is filtered and run into iron tanks and heated nearly to boiling. Iron cages containing tin scrap are immersed in the liquor and immediately double decomposition ensues, the lead being thrown out as spongy metallic lead and the tin going into solution as stannate of soda. It is preferable to have at least three tanks containing the plumbate liquor so that the clean tin scrap is first immersed in the nearly exhausted liquor and then into the stronger liquor so insuring that all the lead is removed from the weak liquor and that all the tin is removed from the partially stripped scrap by means of the strongest plumbate liquor. The detinned scrap is then washed and baled. The stannate of soda liquor containing the spongy lead suspended but no lead in solution is then run through a centrifugal machine and the spongy lead separated and washed. It is then packed in that state and used for storage batteries, or other purposes.

The stannate of soda liquor and the washings are run into a series of iron tanks similar to the previous ones and treated with zinc or galvanized iron scrap in the same way that the plumbate of soda was treated with tin scrap. We have now zincate of soda in solution with spongy tin suspended. This latter is separated and washed in a centrifugal machine and used to make tin salts such as tin crystals, or oxychlorid in the usual way. The zincate of soda is decomposed in electrolytic cells using iron anodes and thin zinc sheets as cathodes, by a current of about 20 amperes per square foot. Zinc is deposited on the cathodes and caustic soda is liberated at the anodes. I do not aim to remove all the zinc but only a portion, and the zincate of soda with a large excess of caustic soda is again used in the process to dissolve more lead oxid. The presence of excess of zincate of soda in the process does not militate against the results. The dezinced iron scrap is washed and sold in that state without bailing, as it is much heavier than the detinned iron scrap.

The reactions all take place at about 180° Fahrenheit.

I claim:

The cyclic method of treating waste lead products, tin scrap and galvanized scrap by first dissolving the lead product in caustic soda, then precipitating the spongy lead by means of tin scrap, thus detinning the scrap and forming stannate of soda, then treating that solution with galvanized scrap, thus dezincing the scrap and forming zincate of soda, then partially electrolyzing the zincate of soda thereby obtaining metallic zinc and a resulting liquor containing zincate of soda and an excess of caustic soda, which is again employed for treating the lead product.

In testimony whereof, I affix my signature in presence of two witnesses.

ALEXANDER S. RAMAGE.

Witnesses:
J. H. BRICKENSTEIN,
C. H. POTTER.